May 6, 1952 F. P. MARTIN 2,595,594
DRIVE AXLE MOUNTING FOR SWINGING AND ROCKING MOTION
Filed June 30, 1947 6 Sheets-Sheet 1

Fig. 1.

Inventor
Fred P. Martin
By Fishburn + Mullendore
Attorneys

May 6, 1952 F. P. MARTIN 2,595,594
DRIVE AXLE MOUNTING FOR SWINGING AND ROCKING MOTION
Filed June 30, 1947 6 Sheets-Sheet 2

Inventor
Fred P. Martin
By Fishburn & Mullendore
Attorneys

May 6, 1952  F. P. MARTIN  2,595,594
DRIVE AXLE MOUNTING FOR SWINGING AND ROCKING MOTION
Filed June 30, 1947  6 Sheets-Sheet 3

Inventor
Fred P. Martin
Fishburn & Mullendore
Attorneys

May 6, 1952     F. P. MARTIN     2,595,594
DRIVE AXLE MOUNTING FOR SWINGING AND ROCKING MOTION
Filed June 30, 1947     6 Sheets-Sheet 5

Inventor
Fred P. Martin
Fishburn + Mullendore
Attorneys

May 6, 1952 F. P. MARTIN 2,595,594
DRIVE AXLE MOUNTING FOR SWINGING AND ROCKING MOTION
Filed June 30, 1947 6 Sheets-Sheet 6

Inventor
Fred P. Martin
By
Fishburn & Mullendore
Attorneys

UNITED STATES PATENT OFFICE 2,595,594

DRIVE AXLE MOUNTING FOR SWINGING AND ROCKING MOTION

Fred P. Martin, Topeka, Kans.

Application June 30, 1947, Serial No. 758,151

3 Claims. (Cl. 180—42)

This invention relates to power operated vehicles such as tractors and trucks having multiple axles, and more particularly to such a vehicle in which all axles are turned for steering and driving power is delivered from the engine to all of the road engaging wheels.

It is desirable in trucks, tractors and the like to have more driving wheels providing increased tractive effort or pulling power of such motor vehicles, however larger vehicles and more power permits the moving of larger loads and results in difficult problems, one of which is the lack of maneuverability, especially when making turns. Steering of vehicles by turning the axles to which power has been applied has been attempted, but problems of power required for such steering and the delivery of driving power to the wheels have not heretofore been solved by a practical structure. Universal drive connections are essential, yet all attempts to create all wheel steering and driving in a vehicle have resulted in structures which were difficult to maintain and regular service requirements subjected the vehicles to undue wear.

The objects of the present invention are to overcome these difficulties in order to increase the traction and pulling power of such motor vehicles and provide for greater control of the multiple driving wheels with increased maneuverability; to provide an all wheel drive vehicle having all axles steered; to provide a vehicle drive in which angularities of universal joints are kept at a minimum at any position of said axles; to provide power steering of multiple axles of a vehicle for easy steering and maneuvering with safety of control; to provide for steering a vehicle by turning all axles, said axles having conventional differential gearing therein; to provide a vehicle with a driving axle having limited universal or swinging movement on said vehicle for turning same while the traction wheels assume different elevation relative to said vehicle in passing over uneven ground; to provide a driving axle with spaced supporting connections on a vehicle, said connections being spaced from said axle and at different elevations and angles from the axis of said axle; to provide a three axle vehicle with a trailer support between the second and third axles, said third axle carrying a frame having articulated connection with the portion of the vehicle carried by the first and second axles; to provide an articulated traction vehicle having more than two driving axles all of which are steered; to provide for pivoting a driving axle of a vehicle on a vertical axis at a support spaced from said axis permitting swinging movement of said axle; and to provide an all wheel driven, all axles steered vehicle that is capable of easy maneuvering, short turning radius, high traction effort, flexibility of operation on all types of terrain, that is efficient, sturdy and economical to operate and maintain.

In accomplishing these and other objects of the present invention, I have provided improved details of structure, the preferred forms of which are illustrated in the accompanying drawings, wherein.

Referring more in detail to the drawings:

1 designates a motor vehicle such as a tractor or truck having a chassis 2 supported on a plurality of axles. In the form of the invention illustrated in Figs. 1 to 4 inclusive the chassis is of articulated structure, consisting of a frame 3 carrying an engine 4 preferably in the forward portion thereof, and a load carrying frame 5 pivotally connected to the frame 3 as later described. The frame 3 is supported on a front axle housing 6 and intermediate axle housing 7, and the frame 5 is carried on the frame 3 and a rear axle housing 8, the axles being carried by wheels 9, 10 and 11 respectively. The frame 3 consists of spaced channel members 12 and 13 arranged longitudinally of the vehicle and connected adjacent their forward ends by a transverse channel member 14, the ends of which are suitably connected as by welding or the like to the longitudinal channel members, said longitudinal members also being connected by other transverse members or suitable bracing to provide a rigid frame structure. The axles 6, 7 and 8 conform to well known design of commercial automobile rear axles, except for slight alterations and additions as become necessary to adapt the same for the use herein exemplified. No brake mechanism is illustrated as such mechanism may be conventional and forms no part of the invention.

Figure 5:
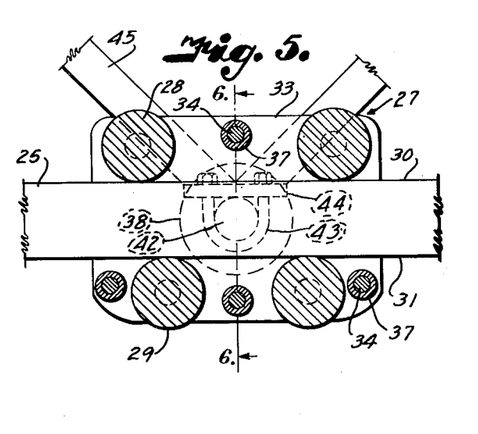
Fig. 5 is a vertical sectional view on the line 5—5, Fig. 6, illustrating the connection of the front axle support to the chassis.
Figure 6:
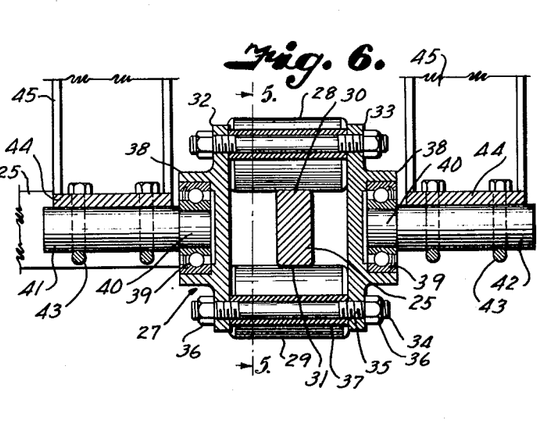
Fig. 6 is a vertical sectional view on the line 6—6, Fig. 5 through the front axle support.
Figure 7:
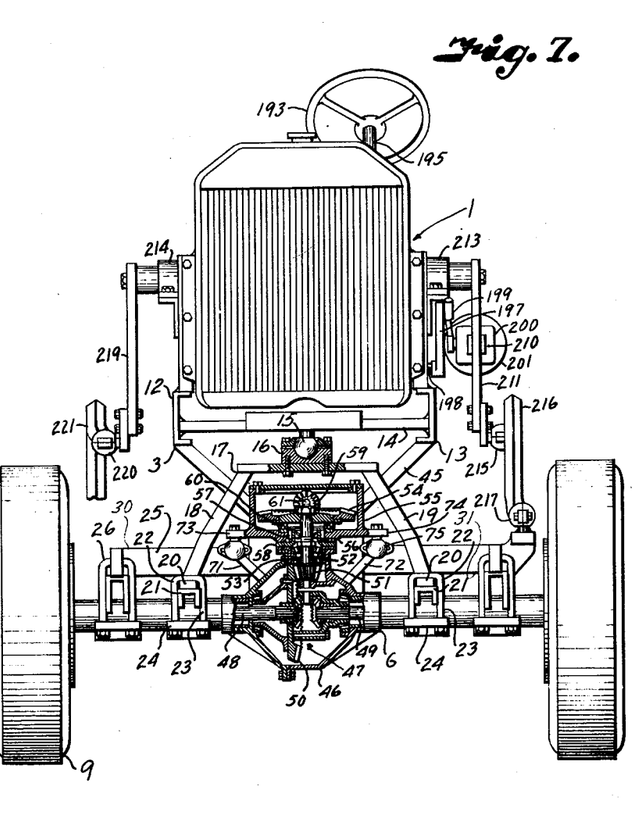
Fig. 7 is a front elevation of the motor vehicle, portions of the axle housing and drive therefor being broken away to better illustrate the parts therein.

Depending from the channel member 14 and preferably centrally arranged relative to the longitudinal channels 12 and 13 is a ball member 15 universally rotative in a spherical socket member 16 suitably secured to the upper portion of an A-frame or yoke 17, said A-frame having outwardly and downwardly directed legs 18 and 19, the lower ends of which are provided with feet 20 adapted to rest on suitable pads 21 mounted on the upper portion of the axle housing 6, the spacing between the feet 20 being illustrated as slightly less than the spacing between the frame members 12 and 13. The feet 20 are secured to the axle and the pads 21 thereon by means of U-bolts 22 engaging over the upper portion of the feet and having legs 23 extending downwardly therefrom and through suitable apertures in a plate 24 extending under the axle housing 6, nuts being applied to the ends of the U-bolt legs for drawing the plate 24 into snug engagement with the axle housing 6.

In order to stabilize the universal action of the front axle mounting, and particularly to eliminate longitudinal movement of said axle relative to the vehicle, the stabilizing mechanism consists of an arcuate member 25 arranged substantially in a plane at right angles to the vertical axis extending through the ball and socket members 15 and 16. The arcuate member 25 preferably consists of a heavy flat bar or other suitable structural shape bent in the form of a semicircle and having its ends secured as at 26 to the axle housing 6 by means of suitable U-bolts and plate structure similar to that for anchoring the A-frame 17 to said axle. The ends of the semi-circular member 25 are preferably secured to the axle between the wheels 9 and the feet 20 of the A-frame, and extend to the rear of said axle housing 6, the arcuate member extending through a support structure 27 which permits the arcuate member to move when the axle 6 is turned about a vertical axis and permits lateral oscillation of said axle and arcuate member as when the wheels pass over uneven terrain. The support 27 preferably consists of suitable rollers 28 and 29 having rolling engagement with the upper and lower ends 30 and 31 of the arcuate member 25 and rotatably mounted in spaced plates 32 and 33, said plates being held in suitably spaced relation by means of studs 34 extending through apertures 35 in said plates and having nuts 36 threaded on the ends of said studs to draw the plates together and into engagement with suitable spacers 37 arranged on the studs between said plates. Each of the plates is provided with bosses 38 having suitable antifriction bearings 39 mounted in bores in said bosses, said bearings 39 being mounted on ends 40 of stub shafts 41 and 42 secured by means of U-bolts 43 to the lower end 44 of suitable bracing 45 carried by the longitudinal frame members 12 and 13.

The stub shafts 41 and 42 are preferably arranged in parallel relation to the longitudinal center of the frame 3, whereby the bearings 39 permit rotative movement of the plates 32 and 33 in a vertical plane transversely arranged relative to the vehicle frame 3. This structure prevents upward or downward movement of the rear portion of the arcuate member 25, thereby preventing movement of the axle 6 longitudinally of the vehicle. It does provide for lateral movement simultaneously with the turning movement of the axle about the ball and socket members 15 and 16, thereby providing for suitable movement of the axle 6 when the wheels pass over uneven ground. The axle housing 6 includes a differential gear housing 46 enclosing conventional differential gearing 47 operatively connected to axles 48 and 49 extending through the axle housing 6 and operatively connected with the wheels 9.

The differential gearing includes the conventional ring gear 50 meshing with a bevelled pinion 51 mounted on a drive shaft 52 rotatably mounted in suitable bearings 53 mounted in a vertically arranged extension of the housing 46 whereby the shaft 52 is on a vertical axis extending through the ball and socket members 15 and 16. The upper end of the shaft 52 carries a ring gear 54 enclosed in a housing 55 which is supported on a bushing 56 by roller bearings 57, said bushing having a flange 58 secured by suitable fastening devices, such as screws, to the extension of the differential housing 46. This structure permits the housing 55 and the axle housing 6 to have relative rotation. The bevelled gear 54 meshes with a bevelled pinion 59 and any thrust imparted by the bevelled pinion to the bevelled gear is taken by a thrust bearing 60 between the gear 54 and the lower part of the gear housing 55.

The bevelled pinion is mounted on a shaft 61 which is carried in suitable bearings in a housing extension 62 projecting rearwardly of the housing 55 and arranged perpendicular to the axis of the shaft 52. The rear end of the shaft 61 is suitably connected to a drive shaft 63 by means of a suitable universal joint 64. The drive shaft 63 preferably consists of telescoping keyed members to provide expansion and contraction of the drive shaft 63. The rear end of the drive shaft 63 is connected by a universal joint 65 with a shaft 66 extending forwardly from adjacent the lower end of a housing 67 enclosing suitable transmission mechanism such as chains and sprockets or gears operatively engaged to receive driving power from the conventional transmission enclosed in the housing 68 mounted on the rear of the engine 4, which is suitably supported on the frame members 12 and 13 as at 69. This arrangement connects the engine with the differential gearing and the axle housing to deliver power thereto with the shaft 63 substantially horizontally arranged and in parallel relation to the frame members 12 and 13.

Since the axle housing 6 is rotatable about a vertical axis extending through the shaft 52 and is rotatable relative to the housing 55, said housing may be held against rotation relative to the chassis by means of a wishbone connection 70 with the frame. Said wishbone arrangement consists of arms 71 and 72, the forward ends of which are connected to ears 73 and 74 extending laterally of the housing 55 by means of ball and socket devices 75. The arms 71 and 72 converge and are connected to a collar 76 slidable and rotatable on a shaft 77, the rear end of which is connected by a ball and socket connection 78 mounted on the lower end of a bracket 79 which is secured to the rearmost brace 45. The wishbone structure permits free oscillatory movement of the axle housing on the ball and socket members 15 and 16 but maintains the gear housing extension 62 substantially in alignment with the shaft 66 of the transmission housing 67.

The rear portions of the longitudinal frame members 12 and 13 are connected by a transverse member 80, having a depending boss 81 centrally located thereon for mounting a suitable bearing 82, for example a tapered roller bearing capable of withstanding radial and thrust loads. The outer race of the bearing 82 is carried within an upstanding flange 83 on the upper end of an A-frame or yoke 84, a suitable fastening device 84' securing the A-frame and the transverse member 80 and providing adjustment for the bearing 82. The A-frame 84 has depending legs 85, the lower ends of which are provided with feet 86 which are secured to the axle housing 7 by means of U-bolts or the like 86' in substantially the same manner as the A-frame or yoke 17 is secured to the axle housing 6, the spacing of the feet 86 being substantially the same as the spacing of the feet 20 on the A-frame 17.

Figures 15, 16, 17:
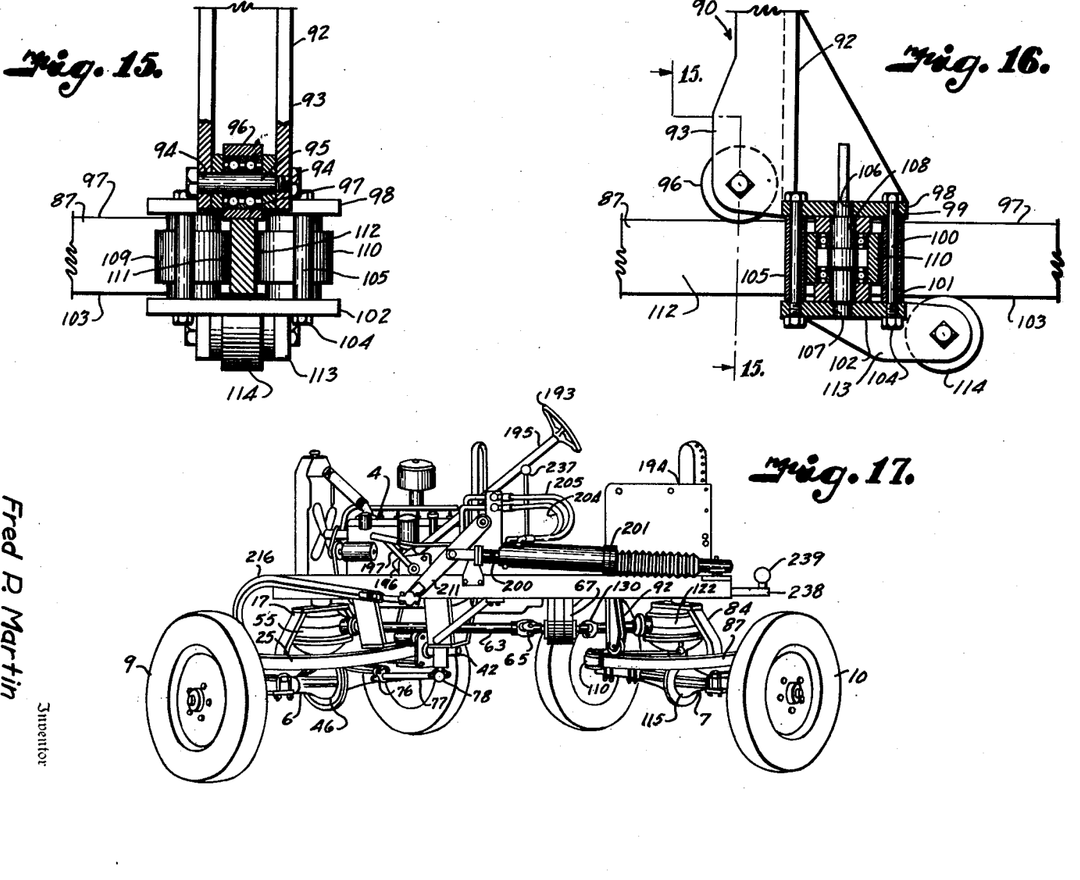
Fig. 15 is a vertical sectional view through the intermediate axle support on the line 15—15, Fig. 16.
Fig. 16 is a vertical sectional view through the intermediate axle support.
Fig. 17 is a perspective view of a motor vehicle having two axles embodying the features of the present invention.

Secured to and extending forwardly of the axle housing 7 is an arcuate member 87 preferably semi-circular in shape and substantially the same as the arcuate member 25, the ends 88 of the arcuate member being secured as at 89 to the axle housing 7 by U-bolts or the like similar to the mounting of the arcuate member 25 on the axle housing 6. The arcuate member 87 is preferably arranged on a horizontal plane perpendicular to the axis of the bearing 82 and operates in spaced supports 90 and 91 arranged forwardly of the axle housing 7, said supports stabilizing the axle housing 7 and preventing longitudinal or lateral movement thereof. Each of the supports 90 and 91 consists of a bracket member 92 having their upper ends secured to the frame members 12 and 13 and are suitably ribbed to form a rigid structure. The outer portion of the brackets is provided with spaced flanges 93 having suitable apertures 94 for mounting a shaft 95 adapted to carry a roller 96 for engaging the upper edge 97 of the arcuate member 87 to prevent upward movement of the forward portion of said arcuate member. The lower ends of the brackets 92 are provided with plates 98 spaced slightly above the upper edge 97 of the arcuate member 87 and provided with spaced apertures 99 adapted to receive bolts 100 extending downwardly from the plate 98 and through aligned apertures 101 in a plate 102 spaced below the lower edge 103 of the arcuate member 87, the plate 102 being held in position by means of nuts 104 applied to the threaded lower end of the bolts 100 to draw the plate 102 into engagement with spacers 105 sleeved on the bolts 100 and engaging the plates 98 and 102. The plates 98 and 102 have vertically aligned apertures 106 and 107 arranged on opposite sides of the arcuate member 87 and adapted to carry shafts 108 mounting suitable rollers 109 and 110 engaging the side faces 111 and 112 of the arcuate member 87. Carried on the plate 102 are spaced ears 113 for supporting a roller 114 adapted to engage the lower edge 103 of the arcuate member 87. The rollers 96, 110, 109 and 114 on each of the brackets 92 support the arcuate member 87 to permit free movement thereof through the rollers when the axle housing 7 is turned on a vertical axis, but prevents any other movement of said axle member 7.

The axle housing 7 includes a gear housing 115 for enclosing suitable differential gearing 116 substantially the same as conventional automotive bevelled gear differential structure, wherein a ring gear 117 is operatively meshed with a bevelled pinion 118 mounted on a pinion shaft 119 carried in suitable bearings 120 mounted in a differential gear housing extension 121 vertically arranged relative to the axle housing 7 in such a manner that the shaft 119 is arranged coaxially with the axis of the bearing 82. Rotatably mounted on the housing extension 121 is a gear housing 122 enclosing a bevelled gear 123 having meshing engagement with a bevelled pinion 124 mounted on a shaft 125 carried in suitable bearings 126 of a housing extension 127, said extension being arranged forwardly of the housing 122 and substantially coaxial with the portion 128 of the shaft 66 which extends rearwardly of the transmission housing 67, the shaft 125 and the shaft portion 128 being connected by a drive shaft 129 and suitable universal joints 130 and 131, whereby power is delivered from the engine 4 through the transmission enclosed in the housing 67 and by the drive shaft 128 to the bevelled pinion 124 to drive the gear 123 to deliver power to the differential gearing 116 which is connected in a conventional manner with the wheels 10 for driving same and permitting said wheels 10 to rotate at different speeds as when the vehicle is turning or negotiating an arcuate path. In order to maintain the gear housing extension 127 in substantial alignment with the shaft portion 128 when the axle housing 7 is turned, a wishbone 132 is arranged with its forward end connected by a ball and socket joint 133 with a transverse member 134 secured to the bracket members 92, said wishbone having arms 135 arranged on each side of the gear housing 122 and secured thereto by ball and socket joints 136.

Figure 1:
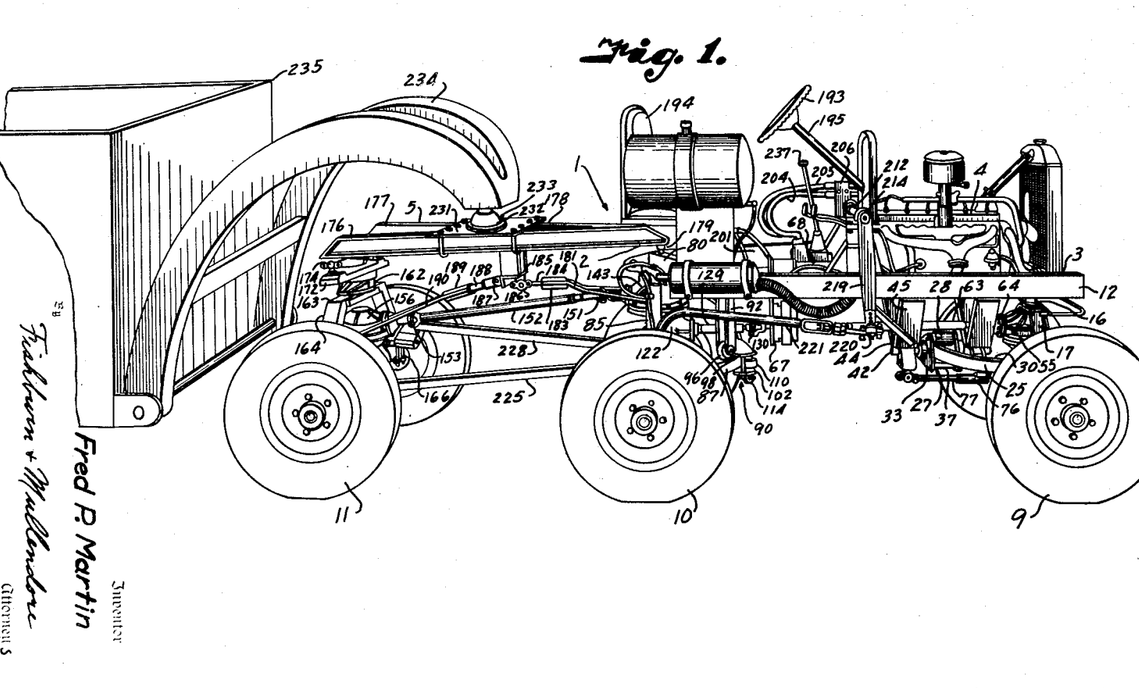
Fig. 1 is a perspective view of a motor vehicle embodying the features of the present invention and having a load carrying device operatively connected thereto.
Figure 2:
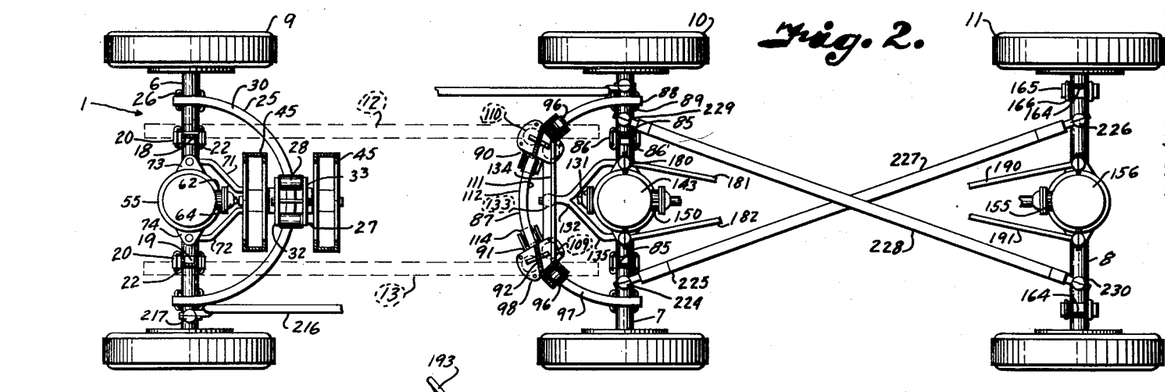
Fig. 2 is a horizontal sectional view through the motor vehicle on the line 2—2, Fig. 3, particularly illustrating the axle connecting and supporting members.
Figure 3:
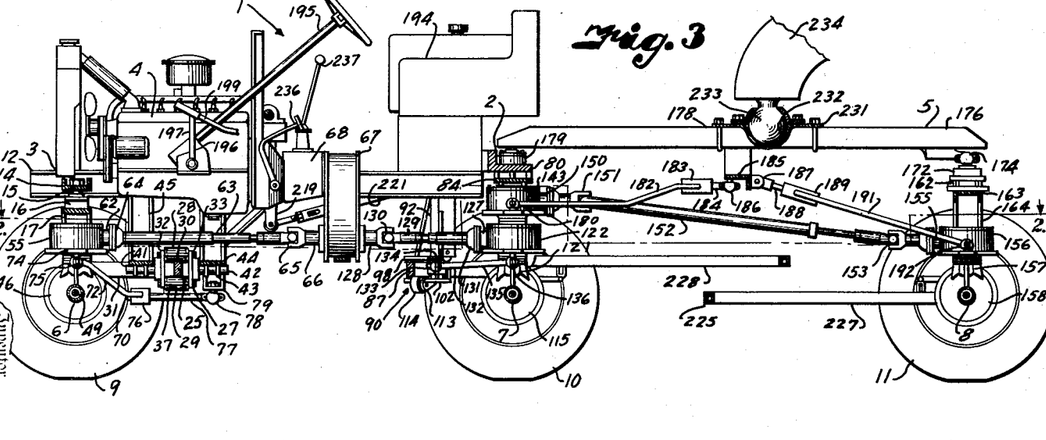
Fig. 3 is a vertical sectional view through the vehicle illustrating the mechanism for delivering driving power from the engine to the road engaging wheels.
Figure 4:
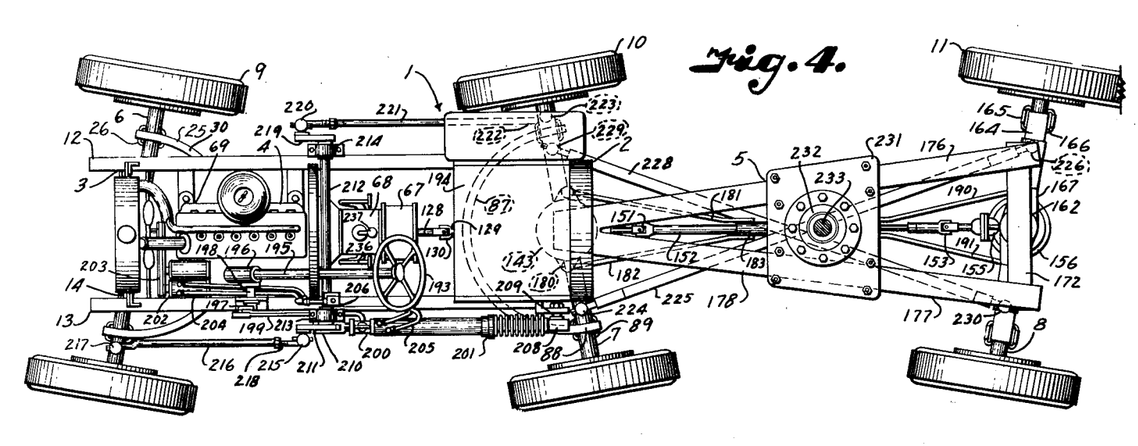
Fig. 4 is a plan view of a motor vehicle having an articulated chassis supported on three axles.
Figure 8:
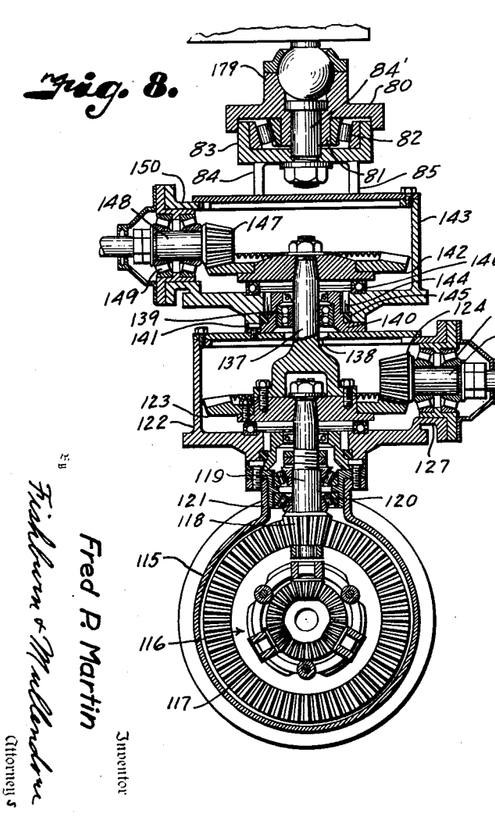
Fig. 8 is a vertical sectional view through the differential and associated reduction gears and drive connection of the intermediate axle.

In the three axle structure as illustrated in Figs. 3 and 8, an extension shaft 137 is secured to the upper face of the ring gear 123, said shaft extending upwardly through an aperture 138 in the upper portion of the housing 122 and through a bearing 139 carried by a collar 140 having a flange 141 secured to the upper face of the housing 122. Secured to the upper end of the shaft 137 is a ring gear 142 enclosed in a gear housing 143 rotatably mounted as by bearings 144 on the collar 140, suitable seals 145 being applied to the gear housing for sealing the openings surrounding the bearings 144. A thrust bearing 146 is mounted between the gear 142 and the lower part of the housing 143. Meshing with the gear 142 is a bevelled pinion 147 carried on a shaft 148 suitably mounted in bearings 149 carried in gear housing extension 150, said extension extending toward the rear of the vehicle. The shaft 148 is connected by suitable universal joints 151 with a drive shaft 152 formed of telescoping members for extension and contraction of said drive shaft during the turning of the various axles. The rear end of the drive shaft 152 is connected by a universal joint 153 to a gear pinion shaft 154 mounted in suitable bearings in a gear housing extension 155 extending forwardly of a gear housing 156. The housing 156 is rotatably mounted on an extension 157 of a differential gear housing 158 of the rear axle housing 8, said shaft 154 carrying a bevelled gear pinion 159 meshing with a ring gear 160 mounted in the housing 156 and connected with the differential gearing 161 in substantially the same manner as the structure connected with the axle housing 6.

Figure 9:
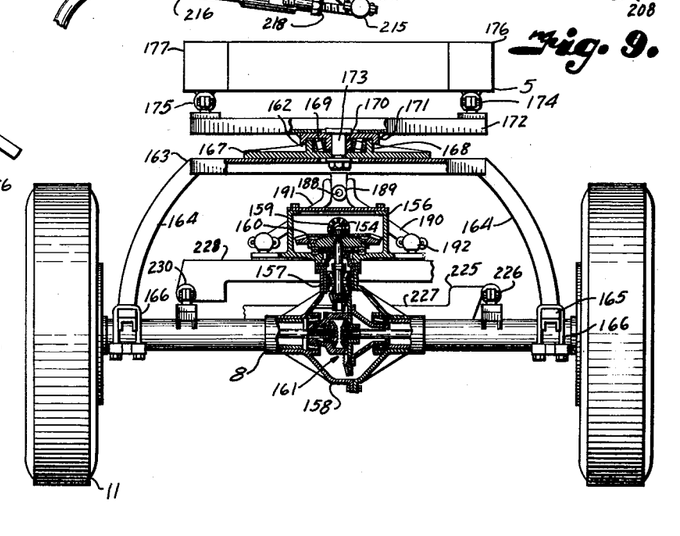
Fig. 9 is a rear elevation of the third axle, portions being broken away to better illustrate the parts of the drive therefor.

The axis of the shaft in the differential gear housing extension 157 is coaxial with the axis of a bearing structure 162 mounted on the upper portion of an A-frame or yoke 163 having diverging legs 164 provided with feet 165 secured to the upper portion of the axle housing 8 by means of suitable U-bolts or the like 166, said connection of the feet and the axle being substantially the same as that described in the connecting of the feet 20 with the axle housing 6. The bearing structure 162 consists of a plate member 167 having an upstanding flange 168 mounting a tapered roller bearing 169, the inner race of which is carried by a hollow boss 170 on a plate 171 secured to a cross member 172, the parts of the bearing housing being held together by suitable bolt and nut structure 173 which also serves to adjust the bearing. Mounted on the ends of the cross member 172 by means of ball and socket connections 174 and 175 are the legs 176 and 177 of an A-frame 178, said A-frame forming the structural members of the load carrying portion 5 of the chassis 2. The legs of the A-frame converge at the forward end of the load carrying frame and are secured together, a ball and socket joint 179 being arranged to connect the forward portion of the A-frame 178 to the cross member 89 on the frame 3, thereby providing flexibility of the connection and permitting the load carrying frame to pivot relative to the forward or engine carrying portion of the chassis. This structure also permits up and down movement of the rear portion 5 of the chassis relative to the forward portion of the vehicle.

It is desirable to maintain the drive shaft 152 substantially in longitudinal alignment with the center of the load carrying frame 5, and to control rotation of the gear housings 143 and 156 to maintain the pinion gear shafts therein in longitudinal alignment. This is accomplished by providing the housing 143 with ball and socket connections 180 with arms 181 and 182, the rear ends of which are connected to a collar 183 rotatably and longitudinally movable on a shaft 184 secured to a cross member 185 on the A-frame 178 by means of a ball and socket joint 186. Also secured to said cross member 185 by a pivotal connection 187 is a shaft 188 rotatable and longitudinally movable in a collar 189 having arms 190 and 191 connected by ball and socket connections 192 arranged on each side of the gear housing 156. This arrangement of wish-bone structure maintains alignment of the extensions on the gear housings 143 and 156 regardless of the angle to which the axle housings 7 and 8 are turned.

Figure 10:
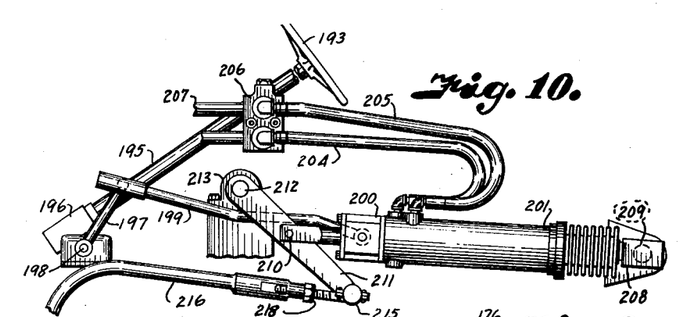
Fig. 10 is a side elevation of the power device for the steering of the vehicle axles.

The structure thus far described provides for the delivery of power from the engine to each of the wheels 9, 10 and 11 for propelling the vehicle and each of the axle housings 6, 7 and 8 is mounted on the chassis in such a manner that said axles may turn freely, as when the vehicle is negotiating a curve. In order to control such turning to provide for steering of the vehicle, a steering wheel 193 is provided on the chassis portion 3 adjacent a seat 194 for the operator. The steering wheel is provided with a post 195 and steering gear structure 196 having a steering arm 197, said arm being rotated by a shaft 198 extending to the side of the steering gear structure. Connected to the end of the steering arm 197 is a link 199 adapted to operate a valve in the housing 200, controlling operation of a piston and cylinder of a hydraulic power steering device 201, fluid pressure being supplied to the hydraulic mechanism by means of a pump 202 preferably mounted on the side of the engine 4 and driven by means of a belt 203 operatively connected to a sheave on the crankshaft of the engine 4. The pump moves liquid from a tank (not shown) through a duct 204 to the hydraulic mechanism 201, the fluid pressure being bled from the hydraulic mechanism under control of the valve in the housing 200 through a duct 205 to a suitable overload relief valve 206 to a duct 207 leading to the fluid supply tank. The hydraulic power mechanism is the same as that now used as a hydraulic booster on busses and other heavy commercial vehicles, the particular structure of the hydraulic system not forming part of this invention, except in connection with its use and arrangement for steering the vehicle.

The steering booster unit or hydraulic mechanism is connected at its rear end 208 by a pivotal connection 209 with the engine carrying portion 3 of the chassis, the forward end of said mechanism being connected as at 210 with an arm 211 carried on a shaft 212 mounted in bearings 213 and 214 suitably supported on each side of the chassis. Therefore the booster unit is installed and connected between a stationary portion of the frame and said arm 211 whereby said booster unit imparts linear force and movement to the arm by utilizing the medium of hydraulic pressure. Said hydraulic mechanism is essentially a double acting hydraulic jack with an integral valve control. Connected to the outer end of the arm 211 by means of a ball and socket joint 215 is a drag link 216, the intermediate portion of which is of higher elevation than the upper portion of the wheel 9 and is curved downwardly and has connection by means of a ball and socket joint 217 connected adjacent the end of the arcuate member 25. In the illustrated instance the arm 211 extends downwardly from the shaft 212 on the left-hand side of the vehicle and is connected to the front axle housing 6 for turning same, a turnbuckle arrangement 218 being provided in the drag link 216 for adjusting the length of same.

Figure 11:
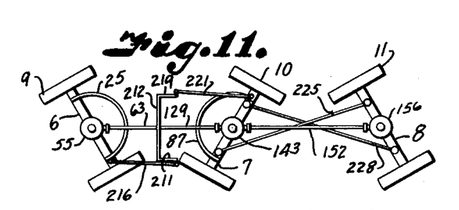
Fig. 11 is a diagrammatic view illustrating the movement of the wheels when the axles are turned with the articulated portions of the chassis in alignment.
Figure 12:
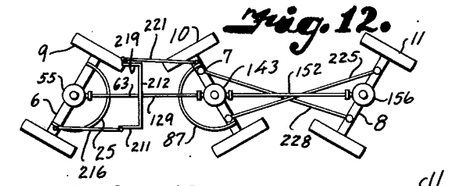
Fig. 12 is a view similar to Fig. 11 with the axles turned in the opposite direction thereto.

Mounted on the right-hand side of the vehicle on the end of the shaft 212 is an arm 219 adapted to extend downwardly from the shaft 212, the end of the arm 219 being connected by a ball and socket joint 220 with a drag link 221 similar to the link 216, and having its rear end 222 connected by means of a ball and socket joint 223 adjacent the end of the arcuate member 87 at the right-hand side of the intermediate axle housing 7. With this arrangement, turning of the steering wheel 193 to the left moves the arm 197 to actuate the control valve in the housing 200, causing the hydraulic device to shorten in length and move the arm 211 toward the rear of the vehicle. This rotates the shaft 212 to also move the arm 219 toward the rear of the vehicle, whereby the axle housings 6 and 7 assume the position shown in Fig. 11. Turning the steering wheel to the right will cause the axle housings 6 and 7 to assume the position shown in Fig. 12.

In order to turn the rear axle housing 8 simultaneously with the turning of the axle housings 6 and 7 the left side of the intermediate axle housing 7 is connected by means of a ball and socket joint 224 with a radius arm 225, the other end of which is connected by means of a ball and socket joint 226 with the right side of the axle housing 8, the radius arm 225 being provided with a center drop portion as at 227, to provide clearance between same and a radius arm 228 arranged to cross over the radius arm 225 by means of an elevated center portion, said radius rod 228 having its ends connected by means of ball and socket joints 229 and 230 with the right side of the axle housing 7 and the left side of the axle housing 8, the spacing of the ball and socket connections on the axle housing 7 being substantially the same as the spacing on the axle housing 8, whereby any turning of the axle housing 7 will effect a similar turning relation to the axle housing 8.

Figure 13:
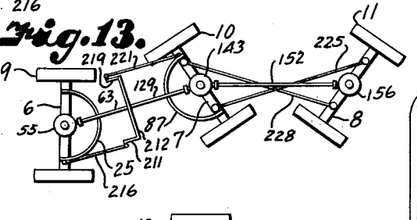
Fig. 13 is a diagrammatic view of the steering portion of the articulated vehicle, the axles being turned as in negotiating an S curve.
Figure 14:
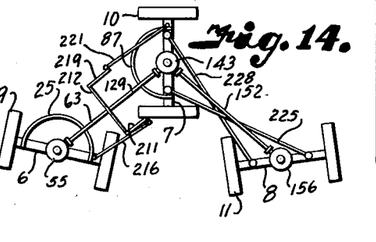
Fig. 14 is a diagrammatic view of the articulated chassis and steering of the axles thereof when moving in a circle.

It is to be noted that the intermediate housing turns in the opposite direction to the front axle and when the portions 2 and 3 of the chassis are in alignment the rear axle 8 turns in the same direction as the front axle 6. Due to the mounting of the forward end of the A-frame 178 on the ball and socket joint 179, there is a tendency for the load carrying portion of the chassis 5 to trail the engine carrying portion 3 of the chassis, however due to the turning of the front and intermediate axles under positive control of the steering wheel there is a combination of turning action and trailing action in the positioning of the rear axle housing 8 during any turning movement of the vehicle. This is illustrated in Figs. 13 and 14 of the drawings.

Any suitable load carrying device may be mounted on the A-frame 178. In the particular instance illustrated a plate 231 having a socket 232 centrally located therein is secured to the A-frame 178 substantially intermediate of the axle housings 7 and 8, said socket 232 being adapted to receive a ball 233 on the forward end of a gooseneck structure 234 of a load carrying trailer 235. Other forms of stripped wheels and pivotal connections may be substituted for the ball and socket arrangement for connecting the load carrying device.

In operating a device constructed as described, the engine 4 is started as in conventional motorized equipment, the clutch pedal 236 operated, the gear shift lever 237 moved to place the power transmission equipment in the proper gear, and the clutch pedal let out to engage the clutch as in conventional practice. The power of the engine is delivered through the transmission mechanism in the housing 67 to rotate the shaft 66, which simultaneously rotates the drive shafts 63 and 129, driving the pinions 59 and 124 to drive the ring gears 54 and 123, thereby driving the differential gearing in the housings 46 and 115 to provide propelling power to the wheels 9 and 10. Simultaneously with the turning of the ring gear 123 the ring gear 142 is rotated through the shaft 137 driving the pinion 147, delivering power to the drive shaft 152 and pinion 154 to rotate the ring gear 160 to drive the gearing in the differential housing 158 and deliver power to the wheels 11. Through this arrangement power is applied to each of the wheels, making an all wheel drive vehicle. In forward movement the rear wheels 11 may move over irregular terrain, the rear portion of the A-frame 178 maintaining the same relative position as the wheels. In other words, if the right wheel raises, so does the right side of the A-frame. This is possible due to the ball and socket mounting 179, the universal joints 151 and 153 on the drive shaft 152, and the ball and socket connections between the gear housings 143 and 156 and the frame member 185. The front wheels 9 may also pass over irregularities, however, in such case the frame does not rise and fall due to the pivotal connection of the plates 32 and 33 carrying the rollers 28 and 29 for stabilizing the arcuate member 25. Therefore the front axle housing 6 may swing about the ball and socket members 15 and 16 in a vertical plane transversely with the longitudinal center of the vehicle. The collar 76, being rotatable and slidable on the shaft 77, maintains the alignment of the gear housing 55 while permitting such swinging motion. When it is desired to turn the vehicle, the steering wheel may be turned, for example to the left, moving the arm 197 to operate the valve in the housing 200 through the link 199, delivering hydraulic pressure to the hydraulic mechanism 201 to contract same and move the arm 211 to the rear. This draws the drag link 216 to the rear and rotates the shaft 212 to move the arm and drag links 219 and 221 respectively to the rear on the right side of the vehicle, thereby causing the left side of the front axle to be pulled to the rear and the right side of the intermediate axle to be moved to the rear. Simultaneously through the radius rods 225 and 228 the rear axle housing 8 will be turned reversely to the position of the intermediate axle. The power for this steering is primarily in the hydraulic mechanism 201 thereby requiring very little effort on the part of the driver to steer the vehicle. After the wheels are turned, as in Fig. 11, forward movement of the vehicle will cause a shifting and simultaneous turning movement of the rear axle housing 8 whereby the rear axle will substantially trail in a curve of the same radius as the front and intermediate axles. This position is illustrated in Fig. 14 wherein the vehicle is negotiating a curve of very short radius. This positive turning of the axle provides a flexibility of control and a tendency for control of the rear axle 8 to such an extent that the vehicle may be moved to the rear without danger of jackknifing chassis portions 3 and 5. This is due to the tendency of the rear axle 8 to assume a position parallel with the intermediate axle 7, thereby counteracting the jackknifing tendency of trailers to provide a more definite control over the rear portion of the articulated chassis than has been possible in ordinary trailer structure.

The arrangement of the radius rods 225 and 228 and the ball and socket joint connection 179 between the A-frame 178 and the cross bar 180 effects a stabilizing effect which is transmitted from the intermediate axle 7 to the rear axle 8. The intermediate axle is stabilized by engagement of the rollers of the stabilizing members 90 and 91 with the arcuate member 87, and the stabilizing of the arcuate member 25 is by engagement of the rollers 28 and 29 therewith. This spacing of the points of support from the axles has the effect of placing a support on the ends of L-shaped arms which provides a leverage action capable of resisting large loads and impact.

In the form of the invention shown in Fig. 17, the frame structure, engine mounting, steering and axle mounting are substantially the same as in the three axle device. Since only two axles are applied to the form shown in Fig. 17, the upper gear housing 145, as shown in Fig. 3, is eliminated and the height of the A-frame or yoke 84 reduced, otherwise the gear structure and housing are the same. In this form of structure a drawbar 238 is placed on the rear of the longitudinal frame members of the chassis and a ball 239 or other suitable mounting device arranged for connecting a load unit to the two-axle tractor device.

It is believed obvious that I have provided a motorized vehicle having a multiple number of axles adapted to be steered with an ease of control and flexibility of operation on all types of terrain providing a flexibility of operation in a high traction vehicle.

What I claim and desire to secure by Letters Patent is:

1. A driving axle mounting for a motor vehicle having a chassis comprising, an axle housing, axles rotatably mounted in said housing, wheels on said axles, a universal joint connecting the axle housing to the chassis, said universal joint being above and in line with the vertical center of the axle housing, a ring-like member arranged in a semi-circle under the chassis and having its ends secured to the axle housing on opposite sides of the center thereof, said ring-like member having upper and lower edges defining spaced parallel planes at right angles to a vertical plane extending through the universal joint and the longitudinal center line of the axle housing, spaced connected members mounted on the chassis for oscillation about a horizontal axis longitudinally of the chassis, and a plurality of spaced rollers between said spaced connected members and rotatably mounted thereon, said rollers engaging the edges of the ring-like member at horizontally spaced points for eliminating bodily movement of the axle housing longitudinally of the chassis yet permitting swinging and turning movement of the axle housing about the universal joint.

2. A driving axle mounting for a motor vehicle having a chassis comprising, a driving axle for said vehicle, a yoke extending upwardly from the axle and secured thereto, a universal joint connecting the yoke to the chassis, wheels on the axle, a ring-like member extending in a semi-circle under the chassis and having its ends secured to said axle, said ring-like member having edges defining spaced planes at right angles to a vertical plane extending through the universal joint and the longitudinal center line of the axle, a member mounted on the chassis for oscillation about a horizontal axis longitudinally of the chassis, and spaced means on said oscillatable member having engagement with the edges of the ring-like member at horizontally spaced points for eliminating bodily movement of the axle longitudinally of the chassis yet permitting swinging and turning movement of the axle about the universal joint, and means for controlling turning of the axle about the axis extending through the universal joint.

3. A driving axle mounting for a motor vehicle having a chassis comprising, an axle housing, axles rotatably mounted in said housing, wheels on said axles, a yoke extending upwardly from the axle housing and having spaced ends secured to the axle housing on opposite sides of the center thereof, a universal joint connecting the yoke to the chassis, said universal joint being above and in line with the vertical center of the axle housing, a ring-like member arranged in a semi-circle under the chassis and having its ends secured to the axle housing on opposite sides of the center thereof, said ring-like member having upper and lower edges defining spaced parallel planes at right angles to a vertical plane extending through the universal joint and the longitudinal center line of the axle housing, spaced members rigidly secured together and pivotally mounted on the chassis for oscillation about a horizontal axis longitudinally of the chassis, spaced rollers between said spaced members and rotatably mounted thereon, said spaced rollers having rolling engagement with the upper and lower edges of the ring-like member at horizontally spaced points for eliminating bodily movement of the axle housing longitudinally of the chassis yet permitting swinging and turning movement of the axle housing about the universal joint, and means for controlling turning of the axle housing about the axis extending through the universal joint.

FRED P. MARTIN.

REFERENCES CITED

The following references are of record in the file of this patent:

UNITED STATES PATENTS

| Number | Name | Date |
|---|---|---|
| 303,497 | Deckmann | Aug. 12, 1884 |
| 421,902 | Britz | Feb. 25, 1890 |
| 732,283 | Ewer | June 30, 1903 |
| 1,342,861 | Morton | June 8, 1920 |
| 1,371,641 | Morton | Mar. 15, 1921 |
| 1,376,286 | Lingard | Apr. 26, 1921 |
| 1,377,096 | Sandstrom | May 3, 1921 |
| 1,405,159 | Polaski et al. | Jan. 31, 1922 |
| 1,447,073 | Gore | Feb. 27, 1923 |
| 1,457,692 | Carter | June 5, 1923 |
| 1,835,412 | Livingood | Dec. 8, 1931 |
| 1,914,267 | Leupold | June 13, 1933 |